United States Patent Office 2,724,005
Patented Nov. 15, 1955

2,724,005
METHOD OF DIMERIZING VINYLIDENE CHLORIDE

Thomas Houtman, Jr., Midland, Mich., assignor to The Dow Chemical Company, Midland, Mich., a corporation of Delaware No Drawing. Application February 15, 1951,
Serial No. 211,201

1 Claim. (Cl. 260—654)

This invention relates to the preparation of trihalopropionic acid. More specifically, the method is concerned with the dimerization of vinylidene halide to a 2,4,4,4-tetrahalo-1-butene intermediate and the subsequent oxidation of the intermediate to $\beta,\beta,\beta$-trihalopropionic acid. The invention will be described more particularly as applied to the chloro compounds although other corresponding halogen derivatives may be prepared in the same way.

It has now been found that $\beta,\beta,\beta$-trichloropropionic acid, a new compound, can be obtained in appreciable yield by the oxidation, preferably with alkaline permanganates, of a new intermediate, 2,4,4,4-tetrachloro-1-butene, formed in the present process. The new butene derivative is prepared by dimerizing vinylidene chloride at low temperatures, preferably below 0° C. in the presence of a catalyst of the Friedel-Crafts type. A halogenated hydrocarbon solvent such as ethylene dichloride, methyl chloroform and the like may be employed as the reaction medium during dimerization if desired. Catalysts of the Friedel-Crafts type suitable for use in the dimerization step of the present process are metal halides such as aluminum chloride, aluminum bromide, ferric chloride, zirconium chloride or mixtures thereof.

The following examples are illustrative of the various methods for carrying out the preparation o the tetrachloro-butene intermediate and the subsequent oxidation of the latter to $\beta,\beta,\beta$-trichloropropionic acid, in accordance with the present invention. The invention, however, is not limited to the details given in the examples.

Example 1

200 parts of monomeric vinylidene chloride and 100 parts of ethylene dichloride were stirred in a reaction vessel with sufficient cooling to obtain a temperature of −70° C. At this point, 13.5 parts of finely powdered aluminum chloride was introduced into the mixture and reaction was allowed to proceed to completion during a 24-hour interval at a temperature between −21° and −28° C. The product thus obtained was stirred with ice water and then separated from the water-catalyst mixture. The separated product was dried and fractionally distilled at a temperature of 53°–56° C. and a pressure of 12 millimeters of mercury to yield about 27.8 per cent, based on the vinylidene chloride used, of 2,4,4,4 - tetrachloro - 1 - butene. This product was characterized by a specific gravity of 1.4343 at 25°/4° C. and a refractive index of 1.4945 at 25° C. This product is a dimer of vinylidene chloride.

Example 2

Another batch of 2,4,4,4-tetrachloro-1-butene was prepared in a similar manner but employing a temperature of −18° to −30° C. over a period of about 16 hours and using the following mixture of materials:

| | Parts |
|---|---|
| Ethylene dichloride | 126 |
| Vinylidene chloride | 100 |
| Aluminum chloride | 13.5 |

The butene derivative was purified by fractional distillation at 27°–31°/0.7 mm. and the yield obtained was 23 per cent, based on the vinylidene chloride used.

Example 3

400 parts of vinylidene chloride was stirred in a reaction vessel with sufficient cooling to obtain a temperature of −21° C. At this point, 13.5 parts of finely divided aluminum chloride was introduced at a rate of 1.5 parts each half-hour until complete addition had been effected. Reaction was allowed to proceed to completion at a temperature between −20° to −29° C. over a period of about 15.5 hours. The product thus obtained was treated with an ion exchange resin to facilitate the removal of the aluminum chloride complex and then was fractionally distilled. A yield of 13 per cent of 2,4,4,4-tetrachloro-1-butene, based on the vinylidene chloride, was thus obtained having the same physical constants as the product of Example 1.

Example 4

6 parts of 2,4,4,4-tetrachloro-1-butene, as obtained in Example 1, was mixed with 25 parts of a 0.2 per cent aqueous solution of sodium carbonate. To this mixture, 21.6 parts of potassium permanganate was introduced with stirring. The mixture was maintained at a temperature between 30° and 40° C. for a period of 5 hours. The resulting reaction mixture was filtered, and the colored filtrate was treated with sulfur dioxide until it became colorless. About 100 parts of ether was used to extract the $\beta,\beta,\beta$-trichloropropionic acid from the colorless filtrate. The ether extract was evaporated down to dryness. A 56 per cent yield of $\beta,\beta,\beta$-trichloropropionic acid, based on the butene derivative, was obtained. This crystalline product was characterized by a neutral equivalent of 176.2 and a melting point of 75°–77° C. The theoretical neutral equivalent is 177.5.

I claim:

The method which comprises forming a mixture of monomeric vinylidene chloride and catalytic amounts of aluminum chloride, wherein vinylidene chloride is the only reagent, subjecting the mixture to temperatures below 0° C. for several hours, separating the reaction mixture from aluminum chloride, and subjecting the reaction mixture to distillation to recover 2,4,4,4-tetrachloro-1-butene, the latter having, where pure, a specific gravity of 1.4343 at 25°/4° C., a refractive index of 1.4945 at 25° C., and boiling between 53° and 56° C. at 12 millimeters and between 27° and 31° C. at 0.7 millimeter of mercury, absolute pressure.

References Cited in the file of this patent

UNITED STATES PATENTS

| | | |
|---|---|---|
| 1,998,309 | Clark et al. | Apr. 16, 1935 |
| 2,371,757 | Henne | Mar. 20, 1945 |
| 2,414,706 | Babcock et al. | Jan. 21, 1947 |
| 2,481,159 | Schmerling | Sept. 6, 1949 |

FOREIGN PATENTS

| | | |
|---|---|---|
| 430,298 | Great Britain | June 17, 1935 |